United States Patent [19]

Graffunder

[11] Patent Number: 4,984,814
[45] Date of Patent: Jan. 15, 1991

[54] ADJUSTABLE PICKUP TRUCK BOX CARRIER

[76] Inventor: Bruce Graffunder, 1305 Independence St., N., Champlin, Minn. 55316

[21] Appl. No.: 396,314

[22] Filed: Aug. 21, 1989

[51] Int. Cl.⁵ ............................ B62B 3/02; B62B 3/10
[52] U.S. Cl. .................................... 280/35; 280/79.3
[58] Field of Search ................... 280/638, 35, 47.331, 280/47.34, 47.35, 414.1, 79.6, 79.7, 87.021, 87.05, 32, 656, 79.3; 414/587

[56] References Cited

U.S. PATENT DOCUMENTS

| | | | |
|---|---|---|---|
| 1,608,419 | 11/1926 | Peacock | 280/35 |
| 2,003,162 | 4/1935 | Ulmer | 280/35 |
| 2,177,153 | 7/1936 | Ross et al. | 280/639 |
| 3,104,890 | 9/1963 | Hill | 280/32 |
| 3,236,392 | 2/1966 | Lamer et al. | 280/35 X |
| 3,278,042 | 10/1966 | Frydenberg | 280/35 X |
| 3,379,314 | 4/1968 | Canning | 280/414.1 X |
| 3,807,750 | 4/1974 | Brown | 280/35 |
| 3,918,733 | 11/1975 | Macho et al. | 280/35 |
| 4,166,638 | 9/1979 | DePrado | 280/638 |

FOREIGN PATENT DOCUMENTS 877851 9/1961 United Kingdom .................. 280/35

Primary Examiner—Charles A. Marmor
Assistant Examiner—Brian L. Johnson
Attorney, Agent, or Firm—Palmatier & Sjoquist

[57] ABSTRACT

The truck box carrier includes a wheeled, load supporting frame which can be adjusted and locked into various positions so that the frame may be used to move and support various configured truck boxes of various sizes. The frame is adjustable in the vertical direction by use of telescopically interactive support legs; in length by supplying telescopically interactive longitudinal side members; and in width by load or box brackets that are transversely adjustable across the width of the frame. The frame members and a load supported by the frame may be locked or secured in place by an indexed aperture and pin locking system.

7 Claims, 2 Drawing Sheets

ADJUSTABLE PICKUP TRUCK BOX CARRIER

FIELD OF THE INVENTION

This invention relates generally to adjustable article supports and, more particularly, to a mobile adjustable pickup truck box carrier or support having a frame that can be adjusted in each of three directions: longitudinally, transversely and vertically. The carrier provides for the safe and secure movement of and work on differently sized truck boxes.

BACKGROUND OF THE INVENTION

Wheeled carriers are known. For example, U.S. Pat. Nos. 2,003,162 (to Ulmer), 3,104,890 (to Hill) and 4,166,638 (to De Prado) disclose such adjustable wheeled carts, supports or dollies. However, the need to vertically position a supported article or object so that work may be performed conveniently on that article without removing it from the carrier is not addressed.

Another problem unaddressed in the prior art is that if work must be performed on the supported article, and in fact, to enable the safe movement of the article while on a carrier, it may be necessary to provide for securing or holding the article in place. U.S. Pat. Nos. 4,166,638, 3,104,890, and 2,177,153 (to Ross et al.) describe some methods for engaging a supported article and holding it in place. An unresolved problem is that such arrangements may interfere with required work operations and access to parts of the supported object.

The problems and needs unaddressed by the prior art are particularly evident in the "body-shop" environment. Pickup truck boxes present difficulties: they vary in size, they must be moved to various work stations such as sanding, bodywork, painting stations and workers need interference free access to body panels for painting. The adjustable carrier of the present invention in large part solves the problems outlined above.

SUMMARY OF THE INVENTION

The truck box carrier includes a wheeled, load supporting frame which can be adjusted and locked into various positions so that the frame may be used to move and support differently configured truck boxes of various sizes. The frame is adjustable in the vertical direction by use of telescopically interactive support legs; in length by supplying telescopically interactive longitudinal side members; and in width because the frame includes load or box brackets that are transversely adjustable across the width of the frame. The frame members and a load supported by the frame may be locked or secured in place by a locking system which includes set screws and an indexed bolt or pin/aperture arrangement.

The frame of the present invention provides the following advantages: it is adjustable for supporting a variety of load configurations; it is adjustable for supporting a load at a selected height or angular position relative to a horizontal plane; it is easily movable with or without a load in place; it is safe because it includes a frame position and load locking system.

It is in an object of the present invention to provide an adjustable carrier which can be reconfigured or adjusted vertically, longitudinally or transversely to move and support truck boxes of various sizes.

It is another object of the present invention to provide an adjustable carrier upon which a truck box can be securely mounted for moving from station to station so that a variety of "body-shop" work (e.g., sanding, painting, etc.) may be performed on the box.

Still another object of the present invention is to provide an adjustable carrier which can be reconfigured vertically, longitudinally and transversely and can be locked in the selected carrier configuration.

These and other objects of the present invention are achieved by providing an adjustable truck box carrier having an adjustable frame including spaced, parallel leg systems; spaced, parallel telescopically interactive longitudinal side members; and transversely adjustable load or box brackets. A locking system for securing the carrier in the desired configuration and for securing a box to the carrier is provided.

Other objects and advantages of the present invention will be understood with reference to the following specification and appended drawings and claims.

DESCRIPTION OF THE PREFERRED EMBODIMENT

Figure 1:
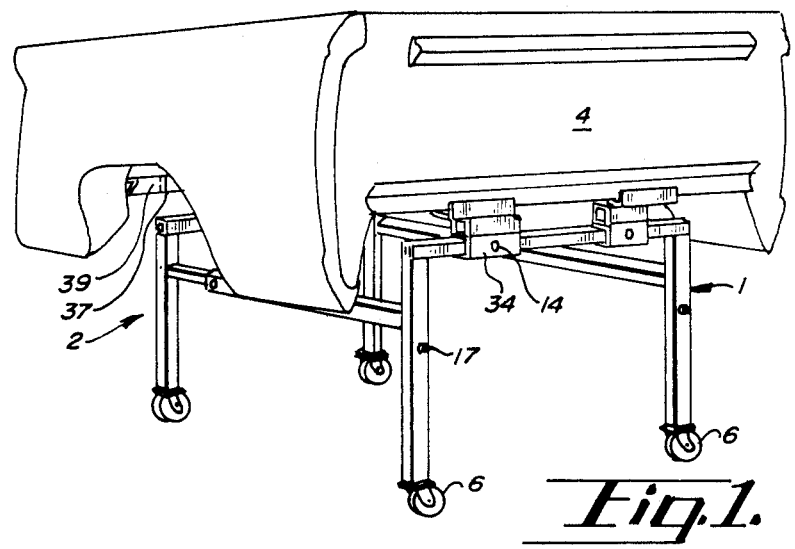
FIG. 1 is a perspective view of the invention with a truck box secured in place.

The adjustable pickup box carrier or support device 2 of the present invention is shown generally and illustratively in FIG. 1. The carrier is shown supporting a work piece, in this instance a pickup truck box 4 for transport or so that work may be performed upon the elevated box. The carrier 2 is equipped with swiveling casters or wheels 6 which can swivel through 360° to provide the carrier 2 with straight line, turning or pivotal movement while transporting a box.

Figure 2:
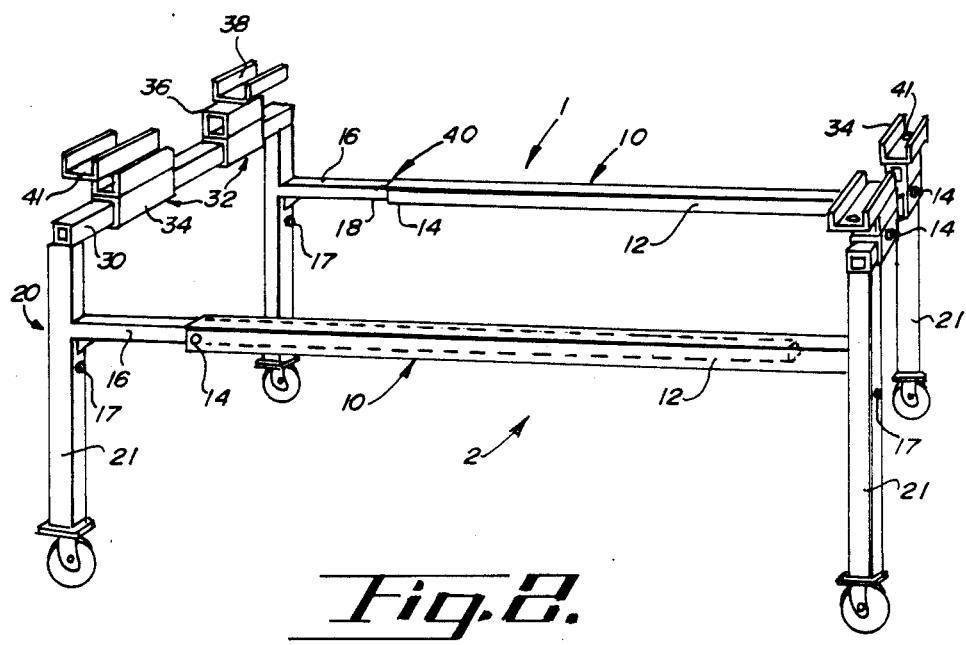
FIG. 2 is a perspective view of the carrier of the present invention.

FIG. 2 shows that the carrier 2 includes a frame 1 having longitudinal side members, indicated generally at 10. The side members include sleeve tube 12 and inner or insert tube 16. The sleeve tube and inner tube are telescopically interactive, thus permitting the carrier to be extended or retracted lengthwise. To secure a selected length of the side members, the sleeve tubes 12 are equipped with set screws 14. The set screws 14 are tightened or screwed in until they contact the inner tube 16, thereby holding the inner tube at the selected length of extension.

The ends of the longitudinal members 10, including sleeve tube 12 and insert tube 16, are connected to leg or vertical supports 20. Each vertical support 20 is made up of a pair of extensible, vertical legs 21. The legs include an outer shell or tube 22 and an inner core 26. Near the uppermost end of the inner core 26, each vertical support 20 is provided with a crossmember 30. The inner cores 26 are attached to, depend from and support the crossmember 30 to form an upside down U-shaped end or vertical support 20. The vertical supports 20 at either end of the longitudinal side members 10 are mirror images of one another, with the exception that the vertical support 20 at one end is attached to inner or insert longitudinal tube members 16 and the support at the other end is attached to sleeve tube 12. Universally swiveling casters or wheels 6 are attached conventionally to the lower end of the vertical supports 20.

Figure 3:
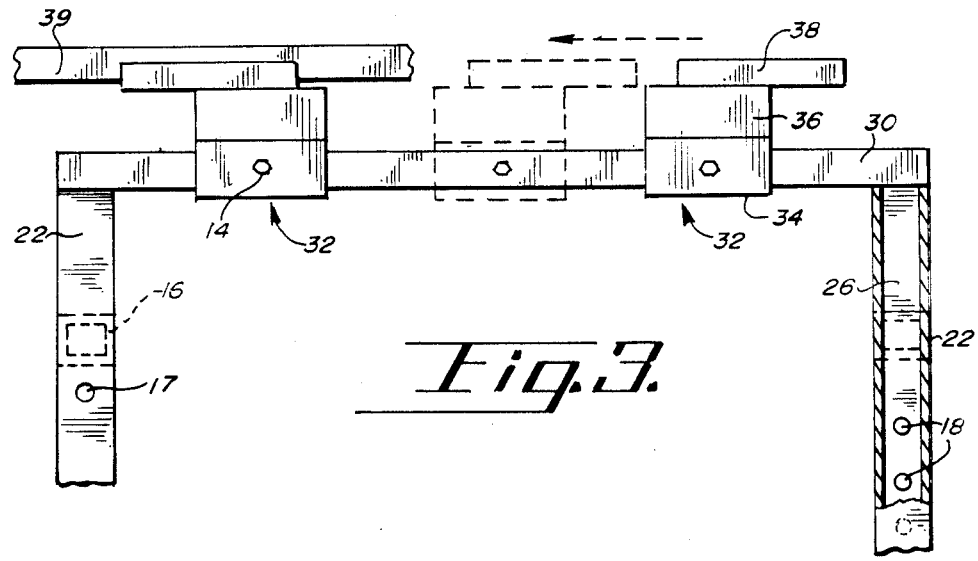
FIG. 3 is an end elevational view, partially in cross section and broken away, including phantom lines showing the transverse adjustability of the present invention.

With further reference to FIG. 2 and with reference FIG. 3, the transverse adjustability of the present invention may be noted. This transverse adjustability is achieved by load securing assemblies 32. These assemblies 32 include a sliding mount 34 movably secured to crossmember 30. Attached to the sliding mount is a pin or bolt spacer 36. A box bracket or channel 38 is attached above or to the upper portion of the spacer 36 and may be complimentary in shape to a typical underbed or box frame member 39. In FIG. 3, phantom lines illustrate the transverse movement of the box securing assemblies 32 to facilitate attaching a truck box thereto. The box bracket or channels 38 are offset from the center of the box securing assemblies 32. This positioning of the box brackets or channels also permits a transverse adjustment for the full width of the carrier 2.

Figure 5:
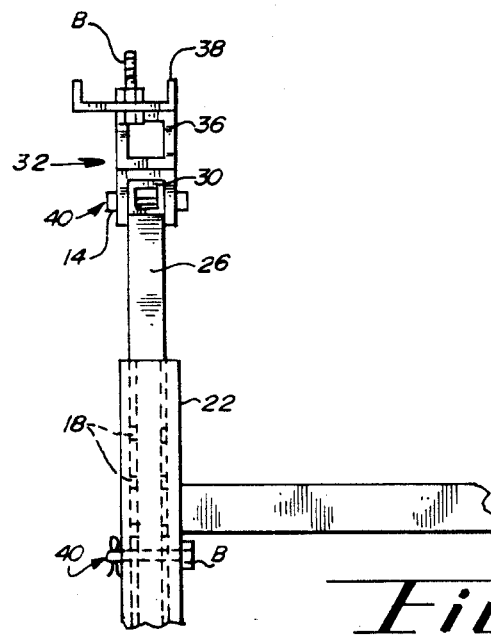
FIG. 5 is a side elevational view, partially broken away.

FIG. 5 illustrates how the vertical adjustment advantage provided by the carrier 2 of the present invention is performed. It can be seen that the inner depending crossmember support core 26 and the outer leg shell tube 22 are telescopically interactive, thus providing an extensible and retractable vertical adjustment feature.

FIG. 5, and FIGS. 2 and 3, also shows that the carrier of the present invention is provided with a locking system 40 for locking the carrier into selected configurations. Basically, the locking system 40 is made up of a plurality of set screws 14 for locking the longitudinal members 10 and the load securing assemblies 32 and a series of registerable apertures 17, 18 for locking vertical supports 20. The apertures 17, 18 for locking the vertical supports 20 at a selected height between the casters 6 and the box brackets 38 are adapted to receive conventional pin or bolt securing means B (see FIG. 5). Apertures 18 are a series of in-line, spaced apertures through cores 26 which may be indexed or put in registry with apertures 17 through shell tubes 22. When in registry, a conventional pin or bolt B may be passed through the apertures 17, 18 and secured, thereby locking shell tube 22 and support cores 26 in place relative to one another and at a particular length. In FIGS. 2 and 5, it can be seen that the locking system 40 also is applied to the transverse adjustment of the load or box securing assemblies 32 and to the longitudinal adjustment of side member 10. For securing these members 10 and assemblies 32 in a selected configuration, the locking system 40 includes a plurality of set screws 14. When the set screws 14 are screwed in or tightened through sleeve tube 12 to contact the inner tube 16, it will be understood that the tubes 12, 16 will be fixed in position relative to each other and at a selected longitudinal length. Likewise, when the set screws 14 are screwed in or tightened through the sliding mounts 34 to contact the crossmembers 30, the box securing assemblies 32 will be fixed in position relative to one another and at a selected transverse width. In addition, the box brackets or channels 38 themselves may be equipped with apertures 41 so that the truck box 4 may be bolted directly to the box brackets 38. That is, typical underbed or underbox frame members 39 (shown in FIG. 1 and 3) have apertures 37 so that the box 4 may be bolted to the truck frame (truck frame not shown). These apertures 37 used for bolting the box 4 to a truck frame may be put into registry with the apertures 41 in the box brackets 38 and a conventional pin or bolt B may be passed through the registered apertures 41, 37 thus securing the box 4 to the carrier 2 of the present invention (see FIG. 5, underbox frame member 39 not shown).

Figure 4:
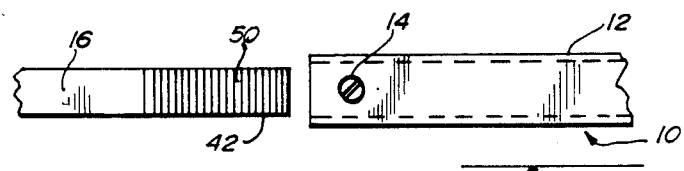
FIG. 4 is a detailed view of the side members broken away.

FIG. 4 is provided to show a detail of the present invention wherein the distal ends 42 of inner insert tube 16 or the inner depending crossmember support core 26 may be provided with an extension limit warning indicator 50. As shown in FIG. 4 using the example of the inner tube 16, this warning indicator 50 may be a colored area or bands of colors at the end of the inner or core telescoping members 16, 26 to indicate the degree of extension.

The carrier of the present invention has been described herein in a single preferred embodiment, but it should be understood that there may be alternative embodiments and modifications that fall within the scope of the present invention. For example, the inner or core members 16, 26, in the longitudinal and in the vertical direction, may be solid. The same might be true of the crossmembers 30. The shape of any of the members (e.g., 12, 16, 22, 26, etc . . .) may be varied. They are depicted as generally square or rectangular but may be round or oval as well. There may be more than two box securing assemblies 32 on any one crossmember 30. At the point where the longitudinal side members 12, 16 meet the vertical supports 20, the carrier 2 of the present invention may be equipped with a hinge-like structure (not shown) which would permit the collapse of the carrier into a generally planar configuration for storage. It should be understood that these alternative embodiments and modifications fall within the scope of the present invention as defined by the following claims.

I claim:
1. An adjustable pickup truck box carrier for body shops where truck boxes are characterized as having body panels, frame members with apertures therethrough, vary in size and must be moved to various work stations and positions for interference free sanding, bodywork and painting, the carrier comprises:
   (a) a pair of inverted U-shaped, parallel spaced vertical supports each having a pair of vertically extensible legs with a cross member therebetween;
   (b) a pair of spaced, parallel, telescopically extensible longitudinal side members extending from and between said vertical supports;
   (c) a pair of load securing assemblies slidably mounted to each cross member to permit transverse movement of the securing assemblies without movement of the supports and the side members; and
   (d) a box bracket on each assembly adaptable to securely receive and hold one frame member of the truck box to the carrier for moving and positioning the truck box on the carrier.

2. The adjustable pickup truck box carrier of claim 1, further comprising apertures in the box brackets and bolts threadably insertable into the frame member apertures through the apertures of the box brackets thereby locking the box to the carrier.

3. The adjustable pickup truck box carrier of claim 1, further comprising locking means to secure the vertical supports, side members and load securing assemblies in a selected position.

4. The adjustable pickup truck box carrier of claim 1, further comprising swiveling wheels attached to said vertical supports.

5. The adjustable pickup truck box carrier of claim 1, wherein the cross members are located at uppermost ends of the legs.

6. An adjustable pickup truck box carrier for body shops wherein truck boxes are characterized as having body panels, having frame members with apertures therethrough, varying in size and must be moved to various work stations and positions for interference free sanding, body work and painting in the body shops, the carrier comprises:

(a) a pair of inverted U-shaped, parallel spaced vertical supports each having a pair of vertically extensible legs each with an upper most end having a cross member extending between each upper most end and swiveling wheels attached to the vertical supports;

(b) a pair of spaced, parallel, telescopically extensible longitudinal side members extending from and between said vertical supports;

(c) a pair of load securing assemblies slidably mounted to each cross member to permit transverse movement of the securing assemblies without movement of the supports and the side members;

a box bracket on each assembly adaptable to securely receive and hold one frame member of the truck box to the carrier for moving and positioning the truck box on the carrier; and a locking means to secure the vertical supports, side members and load securing assemblies in a selected position.

7. The adjustable pickup truck box carrier of claim 6 wherein the locking means for the load securing assemblies comprises apertures in the box brackets and bolts threadably insertable into the frame member apertures through the apertures of the box brackets thereby locking the box to the carrier.

* * * * *